3,315,008
DEHYDROGENATION OF SATURATED HYDROCARBONS OVER NOBLE-METAL CATALYST

Joseph B. Abell, Jr., St. Louis, Loyd W. Fannin, Creve Coeur, and James F. Roth, St. Louis, Mo., assignors to Monsanto Company, St. Louis, Mo., a corporation of Delaware
No Drawing. Filed Dec. 28, 1964, Ser. No. 421,622
7 Claims. (Cl. 260—683.3)

The present invention relates to the catalytic conversion of hydrocarbons. More particularly, the present invention relates to a catalyst composition, its method of preparation and a process for its use whereby saturated hydrocarbons are converted by dehydrogenation to mono-ethylenically unsaturated hydrocarbons.

The use of noble metals as catalytic agents is well known in the prior art. Generally, the noble metal catalytic agents have been proposed in combination with a carrier or support material such as alumina, silica, silica-alumina, silica-magnesia and others. Such compositions usually contain minor amounts of the catalytically active noble metals seldom greater than 5 percent by weight. These noble metal containing catalysts have been used and suggested for such hydrocarbon conversion reactions as dehydrocyclization, reforming, hydrogenation, dehydrogenation, polymerization, alkylation, cracking and the like. However, because of the cost of the noble metal catalysts in relation to their catalytic activity, both initially and over a continued period of time, they have not found wide commercial acceptance.

In order to improve both the initial and the continued activity and to modify the activity of the noble metal containing catalysts, considerable attention has been directed to modifying the catalytic properties of such catalysts. The efforts to modify the properties of the catalysts have most generally taken the form of varying the concentration and choice of components for combination with the noble metals. The prior art has shown that surprisingly different results are obtained when the noble metals are impregnated on different supports. Further, it has been shown that even the choice of the particular noble metal salt from which the noble metal is impregnated onto the support is of criticality in many utilities of noble metal catalysts. It has been recognized by the prior art that for some utilities the acidity of the noble metal containing catalyst is highly important. Thus, it is apparent that many factors enter into adaptation and optimization of the noble metal containing catalysts to the various utilities to which they may be put.

It is an object of the present invention to provide a catalyst composition, a method for its preparation and a process for the conversion of hydrocarbons. Another object of the present invention is to provide a catalyst composition, a method for its preparation and a process for its use whereby saturated hydrocarbons are converted by dehydrogenation to mono-ethylenically unsaturated hydrocarbons. Yet another object of the present invention is to provide a noble metal containing catalyst composition, a method for its preparation and a process for its use in the conversion of hydrocarbons. A particular object of the present invention is to provide a noble metal containing catalyst composition, a method for its preparation and a process for its use in the conversion of hydrocarbons whereby increased initial activity and a longer period of activity are obtained. Additional objects will become apparent from the following description of the invention herein disclosed.

The present invention which fulfills these and other objects is a catalyst composition, a method for its preparation and a process for the dehydrogenation of saturated hydrocarbons to mono-ethylenically unsaturated hydrocarbons. The catalyst comprises 0.02 to 5.0 percent by weight of a noble metal, at least 0.01 percent by weight of a metal selected from the group consisting of alkali and alkaline earth metals and an alumina support, said catalyst being prepared by incorporation of said metal selected from the group consisting of alkali and alkaline earth metals into said alumina support prior to impregnation of said alumina with said noble metal. In carrying out the dehydrogenation process of the present invention, saturated hydrocarbons are contacted in the presence of hydrogen at an elevated temperature, a pressure and contact time sufficient to produce mono-ethylenically unsaturated hydrocarbons, with the catalyst hereinabove described.

The catalyst and process of the present invention result in a significantly improved initial activity of the catalyst as well as a significantly improved activity throughout the period of use of the catalyst. In addition the dehydrogenation process involving the catalyst of the present invention results in an improved conversion of saturated hydrocarbons to mono-ethylenically unsaturated hydrocarbons as well as a good yield of mono-ethylenically unsaturated hydrocarbons. Still further, with the catalyst of the present invention, when used in the dehydrogenation process of the present invention, undesirable side reactions such as cracking, skeletal isomerization and aromatization, as well as the formation of poly-ethylenically unsaturated hydrocarbons and carbon, are substantially reduced.

By "noble metal," as that term is used herein, is meant a metal selected from the group consisting of platinum, palladium, iridium, ruthenium, osmium, and rhodium. While all of these metals included within the scope of the term "noble metal" as defined above, are useful in preparing the catalyst composition of the present invention, the noble metals preferred in practicing the present invention are platinum and palladium. In the particularly preferred manner of practicing the present invention, the noble metal most often used in the catalyst composition is platinum.

The amount of noble metal present in the catalyst of the present invention may vary from as low as 0.02 percent by weight of the total composition to as high as 5.0 percent by weight of the total composition. The optimum amount of noble metal present in the catalyst of the present invention will, of course, vary to some extent depending upon the particular utility to which the catalyst is put. However, it will generally be within these defined limits. Generally, amounts of the noble metals of the present invention in excess of the above limits are avoided because of the relatively high cost of these metals. Noble metal concentrations below those defined above usually are impractical to use because of rather low conversions. In using the catalyst composition of the present invention for the dehydrogenation of saturated hydrocarbons, the concentration of noble metal in the catalyst composition is usually within the range of from approximately 0.02 to 2.0 percent by weight of the total catalyst, preferably 0.02 to 1.0 percent by weight of the total catalyst. In the preferred practice of the present invention in which platinum or palladium are used as the noble metal constituents of the catalyst and in which the catalyst is used in the dehydrogenation of saturated hydrocarbons, it is preferred that the amount of these noble metals present in the catalyst composition be within the range of 0.1 to 1.0 percent by weight of the total composition.

Among the alkali metals useful in the present invention are sodium, potassium, lithium, rubidium and cesium. The preferred alkali metals are sodium and potassium. The alkaline earth metals include particularly magnesium, calcium, barium, strontium and beryllium. The preferred alkaline earth metals are calcium and magnesium.

The amount of alkali metal or alkaline earth metal present in the catalyst of the present invention usually is no less than approximately 0.01 percent by weight of the total catalyst composition. Most often, approximately 0.01 to 20 percent by weight of such material is used. However, it is preferred that the amount of alkali or alkaline earth metal present in the catalyst be within the range of from approximately 0.02 to 5.0 percent by weight of the total catalyst composition.

Though the alumina supports of the present invention include any of the forms conventionally used for supporting catalytically active metals, most often the alumina supports of the present invention possess particular characteristics as to surface area and macropore volume. The alumina carriers useful in the present invention usually possess a surface area of at least 10 square meters per gram. Preferably, these carriers have surface areas of at least 30 square meters per gram. Generally, the alumina carriers of the present invention have macropore volumes of at least 0.05 cc. per gram, preferably, however, the macropore volume of the carriers most useful in the present invention is at least 0.07 cc. per gram. Macropore volume as used herein refers to the total volume of pores within the alumina having a pore radius of greater than 350 angstroms per unit weight of alumina. The macropore volume is expressed herein in terms of cubic centimeters per gram of alumina of pores having a radius greater than 350 angstroms. The use of alumina supports having these limitations as to macropore volume and surface area contributes significantly to the maximum utilization of the noble metal of the catalyst composition. Such maximum utilization of the noble metal in many instances reduces to a very significant extent the total amount of noble metal necessary in the catalyst composition. The macropore volume is determined by Aminco-Winslow mercury porosimeter, Model 5–7170 (American Instrument Company) or equivalent mercury penetration apparatus and represents the internal volume penetrated between 0 to 2500 p.s.i.g. A discussion of macropore volume determination is found in Industrial and Engineering Chemistry, 17, 787 (1945).

The noble metal containing catalyst of the present invention most often contains the noble metal in a highly and uniformly dispersed state. It has been found that high dispersion of the noble metal on the alumina support has a considerable effect on the efficiency of the catalyst of the present invention. Particularly is this so when these catalysts are used in the dehydrogenation process of the present invention. A high dispersion of noble metal on the catalyst support contributes to maximum utilization of the noble metal in the catalyst composition, as well as to increased catalyst activity. Further, catalyst activity is maintained higher by the high dispersion of the noble metal components since agglomeration of the noble metal, which is a cause of activity decline is thereby significantly reduced.

Most often, the noble metal contained in the catalyst of the present invention is uniformly distributed throughout the alkali or alkaline earth metal impregnated alumina. For the purposes of the present invention, uniform distribution is defined in terms of the local concentration of noble metal upon the support. To meet the standards of the present invention, the finished catalyst must have at least 50 percent by weight of the total noble metal present in a catalyst particle present in a local noble metal concentration which is no greater than at least twice that of the total noble meal concentration in the particle. For example, if the total noble metal content of a catalyst particle is 0.1 percent by weight of the particle, then at least 0.05 percent by weight of the noble metal of the particle is distributed such that in any given segment or locale of the catalyst particle a concentration of noble metal in said segment or locale is no greater than 0.2 percent by weight of said segment or locale. The local noble metal concentration for any given segment of a catalyst particle may be determined by electron probe microanalysis as described in "The Microscan X-ray Analyzer Mark II" Cambridge Instrument Company, Ltd., London and Cambridge, England (1961), "Proceedings of the X-ray Colloquium Spectroscopic, Internationale," by V. E. Cosslett, Spartan Books, Washington, D.C., pages 357 to 381 (1963), and in "Metallurgica," 16 No. 367, pages 205 to 212 (May 1960). The uniform distribution of the noble metal within the alumina support contributes materially to increased catalyst activity as well as longer catalyst life.

The most critical feature of the present invention is the order in which the alkali or alkaline earth metal is incorporated into the alumina support in reference to the noble metal. As is shown by the examples hereinbelow presented, a substantial improvement in the activity of the present catalyst is obtained by putting the noble metal on the alumina support last with the alkali or alkaline earth metal being incorporated into the alumina support prior to impregnation of the support with the noble metal. The alkali or alkaline earth metal may be placed on the alumina support by such conventional methods as coprecipitation, impregnation and the like. In a particular useful manner of incorporating the alkali or alkaline earth metal into the alumina support, an alkali or alkaline earth metal salt is first dissolved in a suitable solvent, preferably water when possible. An alumina is then either totally immersed in the solution or is treated with just enough of the solution to be completely adsorbed by the alumina. The amount of metal salt dissolved in the solvent usually is that amount sufficient to place the desired amount of the alkali or alkaline earth metal on the alumina support. Determination of this amount of metal salt is readily within the ability of those skilled in the art. In many instances, it may be desirable to mildly agitate the impregnating alkali or alkaline earth metal containing solution to aid contact between the impregnating solution and the alumina support. After the alumina has been contacted with the impregnating solution of solvent and alkali or alkaline earth metal salt until sufficient alkali or alkaline earth metal has been impregnated onto the support, the impregnated support is removed from the remaining solution, if any, and then dried in air or other such atmosphere at a temperature of 100 to 300° C. After this drying period the catalyst may or may not be further treated by calcination in air or oxygen containing gases at temperatures of 300 to 600° C. Usually, it is preferred that the dried alkali or alkaline earth metal containing alumina support be calcined under these conditions for 1 to 12 hours.

The alkali or alkaline earth metal containing catalyst is next impregnated with the noble metal by contacting the alkali or alkaline earth metal containing alumina support with a solution of the noble metal salt. The amount of noble metal salt dissolved in the solvent is usually that amount sufficient to place the desired amount of the metal on the alumina support. Again, it is often desirable to mildly agitate the impregnating solution to aid contact between the solution and the alumina support. After the alkali or alkaline earth metal-containing alumina support has been contacted with the impregnating solution of solvent and noble metal salt until the solution has been adsorbed, the noble metal impregnated support is then removed from the remaining solution, if any, and dried in air or other such atmosphere at a temperature of 100 to 300° C. After this drying period, the catalyst is usually calcined under the calcination conditions described above. The calcined catalyst most often is next subjected to reduction in the presence of hydrogen or other reducing gas in order to obtain the noble metal in a reduced form. Reduction temperatures above 300° C. are most often utilized. When the catalyst of the present invention is to be used in a process such as dehydrogenation in which free hydrogen is present in the reaction chamber, reduction may take place in the reaction chamber under reaction conditions rather than as a separate step since the conditions of such processes are generally conducive to reduction.

In addition to the above described method of impregnating the alumina support with the alkali or alkaline earth metal constituent of the present catalyst, the alkali or alkaline earth metal may be incorporated into the alumina during the preparation of the alumina. For example, alumina compositions are often prepared by adding a basic precipitant such as ammonium hydroxide to a solution of an aluminum salt whereby alumina is precipitated. If an alkali metal hydroxide is employed as the basic precipitant instead of ammonium hydroxide, the resulting compound comprises an alkali metal containing alumina. This compound can then be washed with a calculated quantity of a mineral acid to remove part of the alkali or alkaline earth metal.

In order to further describe as well as to illustrate the present invention, the following examples are presented. These examples are not to be construed as in any manner limiting the present invention.

EXAMPLE I

Two catalysts were prepared from an alumina having a surface area of 292 square meters per gram a macropore volume of 0.11 cc. per gram. The alumina was in the form of ⅛ inch diameter balls. The alumina was calcined in air for 5 hours at 600° C. One of the catalysts, hereinafter designated Catalyst A, was prepared from this alumina in accordance with the present invention while the other catalyst, hereinafter designated Catalyst B, was prepared from the same alumina but in a manner not in accordance with the present invention.

Catalyst A was prepared by contacting 125 grams (180 ml.) of the calcined alumina support with a solution consisting of 2.0 grams of $NaNO_3$ dissolved in 72 ml. of distilled water, this amount of solution being sufficient to just saturate the alumina. The impregnated alumina was next dried at 150° C. for 9 hours and then calcined in air at 450° C. for 2 hours. The sodium containing alumina was contacted with 73 ml. of an ammonical solution containing 0.889 grams of platinum diamino dinitrite. This solution was prepared by heating an amount of platinum diamino dinitrite sufficient to obtain the above concentration in distilled water and adding 10 milliliters of concentrated ammonium hydroxide per gram of platinum salt and, after dissolving the platinum salt, adjusting the volume of the solution to an amount sufficient to saturate the alumina by addition of water. Next, the platinum salt impregnated catalyst was dried for 18 hours at 150° C. and then calcined in air for 2 hours at 450° C. After calcination, the catalyst was reduced in hydrogen at 440° C. The amount of platinum present in catalyst A was 0.409 percent by weight and the amount of sodium 0.388 percent by weight. The surface area of the finished catalyst was 172 square meters per gram.

Catalyst B was prepared in substantially the same manner as Catalyst A with the exception that the alumina was first impregnated with the platinum and then with the sodium. The amount of platinum in Catalyst B was 0.418 percent by weight and the amount of sodium 0.388 percent by weight of the catalyst.

To demonstrate the advantages of the catalyst and process of the present invention, two separate runs were carried out in which n-dodecane was subjected to the dehydrogenation conditions of the present process in the presence of Catalyst A in one run and Catalyst B in the other run. Reaction conditions in both runs were substantially the same. Hydrogen was introduced concurrently with the n-dodecane in a mole ratio of hydrogen to n-dodecane of 2:1. In each run, the temperature was 435 to 440° C., the pressure substantially atmospheric pressure (±2 p.s.i.) and the liquid hourly space velocity of the hydrocarbons 4.65. The following table gives the percent conversion to mono-olefin of the n-dodecane at various time intervals for both Catalyst A and Catalyst B.

| Time, Hours | Catalyst A | Catalyst B | Time, Hours | Catalyst A | Catalyst B |
|---|---|---|---|---|---|
| 2 | 13.8 | 12.3 | 14 | 11.8 | 10.0 |
| 4 | 13.2 | 11.6 | 16 | 11.6 | 9.9 |
| 6 | 12.8 | 11.2 | 18 | 11.5 | 9.8 |
| 8 | 12.5 | 10.8 | 20 | 11.4 | 9.6 |
| 10 | 12.2 | 10.5 | 22 | 11.2 | 9.5 |
| 12 | 12.0 | 10.3 | 24 | 11.1 | 9.4 |

With the catalyst prepared in accordance with the present invention a 12.2 percent increase in conversion was obtained at the 2 hour time interval and at the end of 24 hours the activity of the catalyst prepared in accordance with the present invention was still such that the percent conversion was approximately 18.1 percent greater than that of Catalyst B which was not prepared in accordance with the present invention.

EXAMPLE II

Two catalyst, hereinafter referred to as Catalyst C and Catalyst D were prepared. Catalyst C was prepared in substantially the same manner as Catalyst A of Example I and Catalyst D was prepared in substantially the same manner as Catalyst B of Example I. The alumina used for preparing both Catalysts C and D was the same as that in Example I with the exception that it was not calcined prior to impregnation. Catalysts C and D were compared in dehydrogenation efficiency in the same manner and under the same conditions with the same feed as in Example I. The percent conversion of the n-dodecane to mono-olefin at various time intervals is given in the following table.

| Time, Hours | Catalyst C | Catalyst D | Time, Hours | Catalyst C | Catalyst D |
|---|---|---|---|---|---|
| 2 | 13.9 | 11.3 | 14 | 11.3 | 9.2 |
| 4 | 13.2 | 10.7 | 16 | 11.0 | 9.0 |
| 6 | 12.7 | 10.2 | 18 | 10.8 | 8.8 |
| 8 | 12.2 | 9.8 | 20 | 10.6 | 8.7 |
| 10 | 11.9 | 9.6 | 22 | 10.4 | 8.6 |
| 12 | 11.6 | 9.3 | 24 | 10.2 | 8.5 |

It will be noticed from consideration of the above example that a 23 percent higher conversion was attained initially with Catalyst C than with Catalyst D at the outset of the two runs. After the 24 hour period of time had elapsed a 20 percent greater conversion was obtained with Catalyst C than with Catalyst D.

The dehydrogenation process of the present invention is generally operated at elevated temperatures. Most often these temperatures are within the range of from approximately 400 to 650° C. At temperatures below this range, conversions are so low that reaction becomes impractical while at temperatures above this range excessive side reactions occur. The preferred temperatures for operating the present dehydrogenation process with the preferred feeds are within the range of from approximately 420 to 520° C.

Pressures at which the present process is operable are somewhat critical to the present invention. The pressure may range from subatmospheric pressure up to 100 p.s.i.g. and higher. However, in most instances, pressures substantially atmospheric, i.e. 0 to 30 p.s.i.g., are used. High pressures are less preferred than low pressures since at higher pressures catalyst conversions are significantly reduced.

The contact time of the saturated hydrocarbons with the catalyst of the present invention in accordance with the dehydrogenation process disclosed herein will seldom be above 5.0 seconds or below 0.05 second. At contact times below this range reaction is incomplete and conversions are low. At contact times above this range there is excessive formation of aromatics, polyolefinic compounds and cracked products. Preferably, a contact time of 0.1 to 2.0 seconds will be used in the practice of the present dehydrogenation process.

One of the most important process limitations of the dehydrogenation process of the present invention is found in the use of a diluent with the hydrocarbon feed to be dehydrogenated. The most commonly used diluent is hydrogen. Hydrogen is usually present in a mole ratio of hydrogen to the saturated hydrocarbon feed of from approximately 0.1:1 to 5:1. However, it is preferred that a hydrogen to hydrocarbon mole ratio of 1:1 to 3:1 be used in operating the present invention.

The feedstocks to the dehydrogenation process of the present invention are saturated hydrocarbons. Included within this group are the straight-chain, branched-chain and cyclic saturated hydrocarbons. Such hydrocarbons may be of from 2 to 30 carbon atoms. Included within this group are such compounds as ethane, propane, butane, pentane, methylpentanes, hexane, methylhexanes, dimethylhexanes, cyclopentanes, cyclohexanes, methylcyclopentanes, methylcyclohexanes, heptane, methylheptanes, nonane, isononane, decane, isodecane, dodecane, isododecane and the like. A particularly effective utilization of the present invention, both the catalyst of the present invention and the dehydrogenation process disclosed herein, resides in the dehydrogenation of straight-chain paraffin hydrocarbons, particularly those of 10 to 18 carbon atoms. The product of the dehydrogenation of these straight-chain hydrocarbons has been found quite unexpectedly to provide an alkylate for the preparation of alkyl aromatic sulfonate detergent compositions which are substantially biodegradable. The preferred feeds of the present invention are those having 6 to 20 carbon atoms per molecule.

The apparatus and arrangement of apparatus for carrying out the dehydrogenation process of the present invention is not particularly critical. It is only necessary that good engineering principles be followed in the design and arrangement of the equipment.

What is claimed is:

1. A process for the dehydrogenation of saturated hydrocarbons to mono-ethylenically unsaturated hydrocarbons which comprises contacting said saturated hydrocarbons concurrently with hydrogen in a mole ratio of hydrogen to saturated hydrocarbons of 0.1:1 to 5:1 at an elevated temperature within the range of 400 to 600° C. and at a pressure and space velocity sufficient to cause dehydrogenation of said saturated hydrocarbons with a catalyst comprising 0.02 to 5 percent by weight of a noble metal, at least 0.01 percent by weight of a metal selected from the group consisting of alkali and alkaline earth metals, and an alumina support having a surface area of at least 10 square meters per gram and a macropore volume of at least 0.05 cc./gram, said noble metal uniformly distributed such that at least 50% by weight of the total noble metal present in a catalyst particle is present in a local concentration of no greater than twice that of the total concentration of noble metal in said catalyst particle, said catalyst being prepared by impregnation of said metal selected from the group consisting of alkali and alkaline earth metal into said alumina support prior to impregnation with said noble metal.

2. The process of claim 1 wherein the pressure is no greater than 100 p.s.i.g.

3. The process of claim 1 wherein the contact time of said saturated hydrocarbons with said catalyst is within the range of 0.05 to 5.0 seconds.

4. The process of claim 1 wherein the saturated hydrocarbons have 2 to 30 carbon atoms.

5. The process of claim 1 wherein the noble metal is one selected from the group consisting of platinum and palladium.

6. The process of claim 1 wherein the metal selected from the group consisting of alkali and alkaline earth metals is an alkali metal.

7. The process of claim 1 wherein the metal selected from the group consisting of alkali and alkaline earth metals is an alkaline earth metal.

References Cited by the Examiner

UNITED STATES PATENTS

| | | | |
|---|---|---|---|
| 2,930,763 | 3/1960 | Haensel | 252—466 |
| 3,126,426 | 3/1964 | Turnquest et al. | 252—466 |
| 3,168,587 | 2/1965 | Michaels et al. | 260—683.3 |

DELBERT E. GANTZ, *Primary Examiner.*

G. E. SCHMITKONS, *Assistant Examiner.*